United States Patent [19]

Buchl

[11] Patent Number: 4,622,884
[45] Date of Patent: * Nov. 18, 1986

[54] FLOATING PISTON DEPTH CONTROL APPARATUS

[76] Inventor: Andrew F. Buchl, 401 9th Ave. SW., Rugby, N. Dak. 58368

[*] Notice: The portion of the term of this patent subsequent to Jan. 3, 2001 has been disclaimed.

[21] Appl. No.: 565,356

[22] Filed: Dec. 27, 1983

Related U.S. Application Data

[62] Division of Ser. No. 253,014, Apr. 10, 1981, Pat. No. 4,423,664.

[51] Int. Cl.⁴ .......................................... F15B 11/08
[52] U.S. Cl. ...................................... 91/445; 91/443; 137/512
[58] Field of Search ................. 92/13.1; 91/445, 171, 91/1, 520, 443, 463; 60/546, 579, 583; 137/512, 599

[56] References Cited

U.S. PATENT DOCUMENTS

| | | |
|---|---|---|
| 1,464,676 | 8/1923 | Harrington . |
| 2,358,826 | 9/1944 | Purat . |
| 2,478,790 | 8/1949 | Stephens . |
| 2,577,462 | 12/1951 | Hackney ............................. 91/167 |
| 2,596,471 | 5/1952 | Densmore . |
| 2,614,536 | 10/1952 | Livers . |
| 2,736,296 | 2/1956 | Romine . |
| 2,755,721 | 7/1956 | Rusconi . |
| 2,882,760 | 4/1959 | Leifer . |
| 2,918,902 | 12/1959 | Robinson ............................ 92/13.1 |
| 3,095,785 | 7/1963 | Cahill ..................................... 91/42 |
| 3,097,572 | 7/1963 | Macy ..................................... 92/13 |
| 3,168,853 | 2/1965 | Prince .................................. 91/167 |
| 3,270,549 | 9/1966 | Martin . |
| 3,319,537 | 6/1967 | Pittman .............................. 92/242 |
| 3,461,805 | 8/1969 | Karkow . |
| 3,832,852 | 9/1974 | Schmucker ........................... 92/61 |
| 3,935,795 | 2/1976 | Hawley ............................... 92/5 R |
| 4,091,715 | 5/1978 | Onderka ................................. 91/1 |
| 4,164,122 | 8/1979 | Ward ................................... 60/583 |
| 4,182,599 | 1/1980 | Eyrick et al. ...................... 92/5 R |
| 4,244,275 | 1/1981 | Smilges ............................... 91/420 |
| 4,343,226 | 8/1982 | de Almeida ........................ 91/171 |
| 4,388,981 | 6/1983 | Fair ..................................... 92/13.1 |

FOREIGN PATENT DOCUMENTS

| | | |
|---|---|---|
| 999277 | 1/1952 | France . |
| 576105 | 4/1958 | Italy . |
| 595703 | 2/1978 | U.S.S.R. ............................. 92/13.1 |

*Primary Examiner*—Abraham Hershkovitz
*Attorney, Agent, or Firm*—Merchant, Gould, Smith, Edell, Welter & Schmidt

[57] ABSTRACT

A remotely controllable adjustable-stroke fluid cylinder system is described in various embodiments. The system includes a floating stop piston (48) and a main piston (24,224) which is controlled by a valving system (70) and which has visual indicator means having a graduated scale (69,169).

1 Claim, 9 Drawing Figures

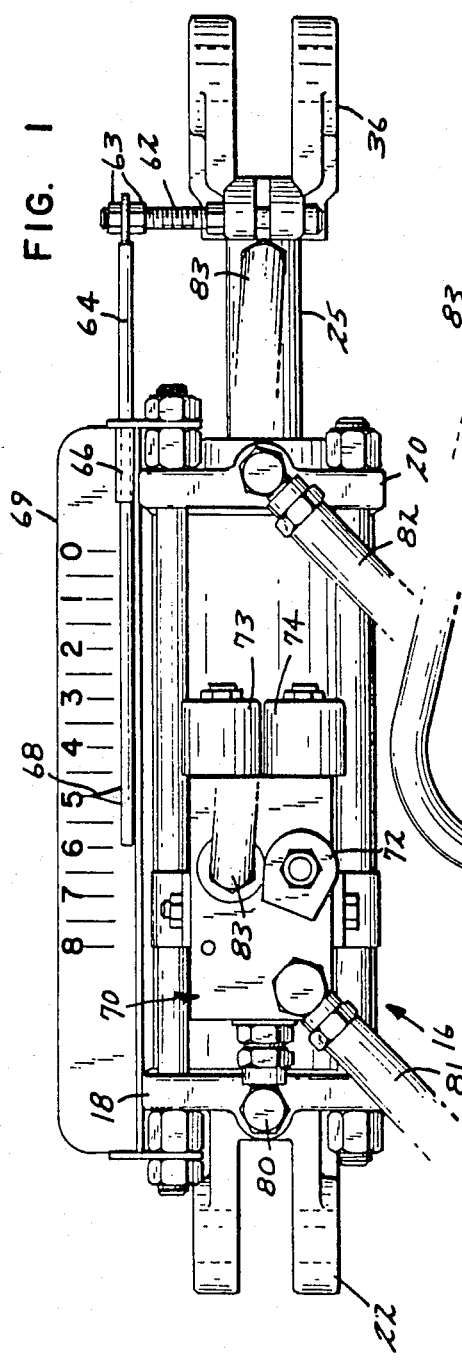
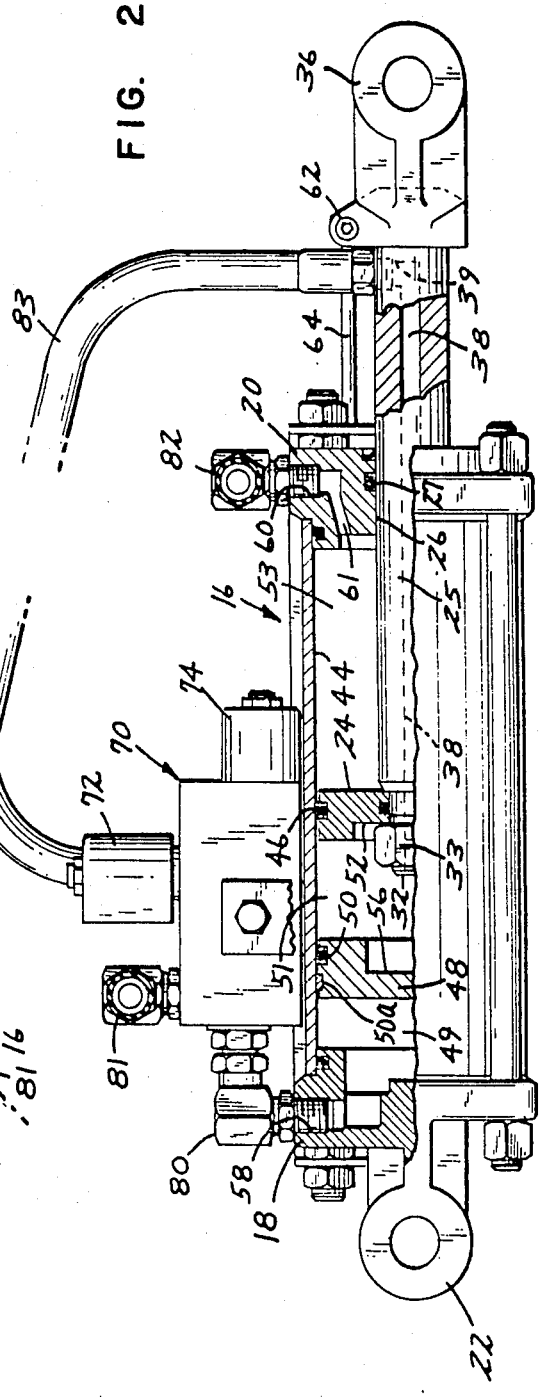
FIG. 1
FIG. 2

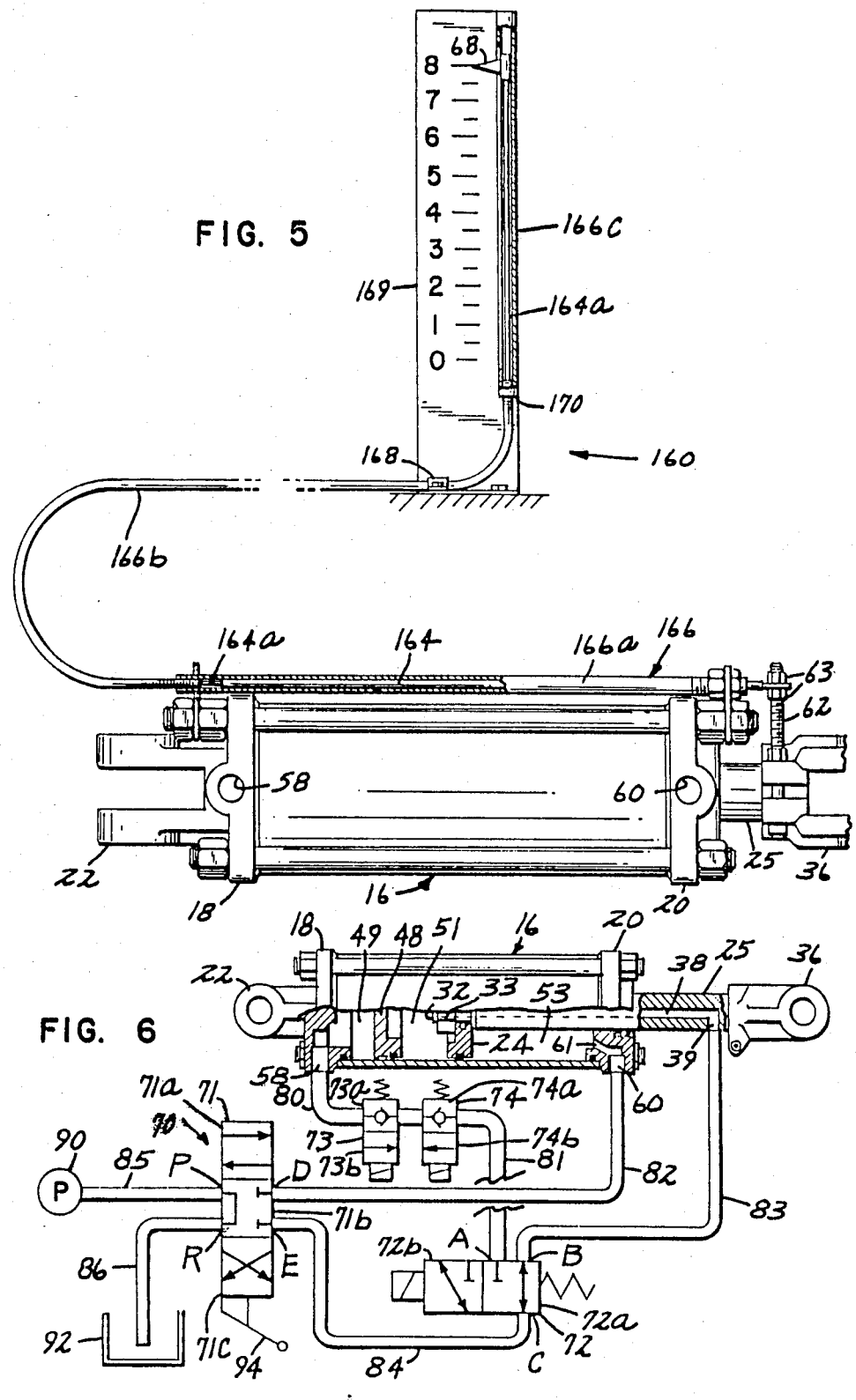

FLOATING PISTON DEPTH CONTROL APPARATUS

Divisional of U.S. patent application Ser. No. 253,014, filed Apr. 10, 1981 and entitled "Depth Control Apparatus," now U.S. Pat. No. 4,423,664, issued Jan. 3, 1984.

TECHNICAL FIELD

This invention relates generally to fluid cylinder control systems which allow for remote setting and readout of piston strokes position, which in turn translates to depth control when used to raise and lower implements.

BACKGROUND OF THE INVENTION

In the manipulation of machinery, particularly farm implements, it is often necessary to hydraulically raise and lower the machinery repeatedly and reliably to preset positions. In the case of farm equipment, for example, it may be necessary for a tractor operator to lower a plow or other implement to a particular postion so as to plow land to a desired depth. This depth may change according to varying requirements and it is therefore necessary that the operator have the ability to change this depth with ease. Furthermore, it may be necessary to frequently raise the implement off the ground for maintenance, or the like, and then return the implement to the proper depth setting.

In the prior art, systems have been developed employing hydraulic cylinders with variable position pistons which serve as stroke limiters for the hydraulic cylinder. In these prior art systems, the position of the stop piston is controlled by adjustable valves. Typically, however, these valving systems are not absolutely fluid-tight and the stop piston may tend to drift from its original preset location. As a result, the tractor operator, for example, will need to reset the depth of the implement many times to ensure uniformity. In addition, these systems lack means for disconnecting the implement from the power source (tractor) while maintaining their preset position and relieving pressure in the couplings for easy disconnection.

Furthermore, this resetting requirement is complicated by the fact that prior art devices lack simple visual means for checking the actual position of the piston, and in turn the relative position of the implement. The present invention discloses a solution to the problem of fluid leakage and the resultant unreliability while independently providing a simple visual indicator which precisely indicates the relative position of the implement to ensure uniformity.

SUMMARY OF THE INVENTION

One aspect of the present invention relates to a hydraulic system having a hydraulic cylinder with a main piston for raising and lowering equipment and a floating piston for limiting the travel of the main piston. The position of the floating piston is adjusted by admitting and draining fluid into the cylinder. Also included is one way check-valve means connected to the cylinder to positively control the admission and drainage of fluid therein, thereby preventing the position of the floating piston from drifting. This system may also include coupling means which allow for detachment of a source of hydraulic fluid from the system. There may also be included an indicator means connected to the cylinder for indicating the position of the piston.

In accordance with another aspect of the invention, there is described a system for indicating the position of a piston within a hydraulic cylinder.

According to a further aspect of the invention, there is described a hydraulic system having a main cylinder, a floating piston, check valve means for controlling the passage of fluid into and out of the cylinder, and control valve means for directing the flow of fluid into various portions of the cylinder, causing the piston to move in a desired manner.

Thus there have been outlined rather broadly the more important features of the invention in order that the detailed description thereof may be better understood, and in order that the present contribution to the art may be better appreciated. There are, of course, additional features of the invention that will be described hereinafter and will form the subject matter of the claims appended hereto. Those skilled in the art will appreciate that the conception on which the disclosure is based may readily be utilized as a basis for the designing of other structures for carrying out the invention. It is important, therefore, that the claims be regarded as including such equivalent structures as do not depart from the spirit and scope of the invention.

BRIEF DESCRIPTION OF THE DRAWINGS

FIG. 1 is a top plan view of a preferred embodiment of the present invention;

FIG. 2 is a side elevation with portions being broken away and shown in section;

FIG. 5 shows an embodiment alternate to that of FIG. 1 having a remote indicating display;

FIG. 6 is a schematic diagram showing an embodiment similar to that of FIG. 3 without the slave cylinders;

DESCRIPTION OF THE PREFERRED EMBODIMENT

Figure 3:
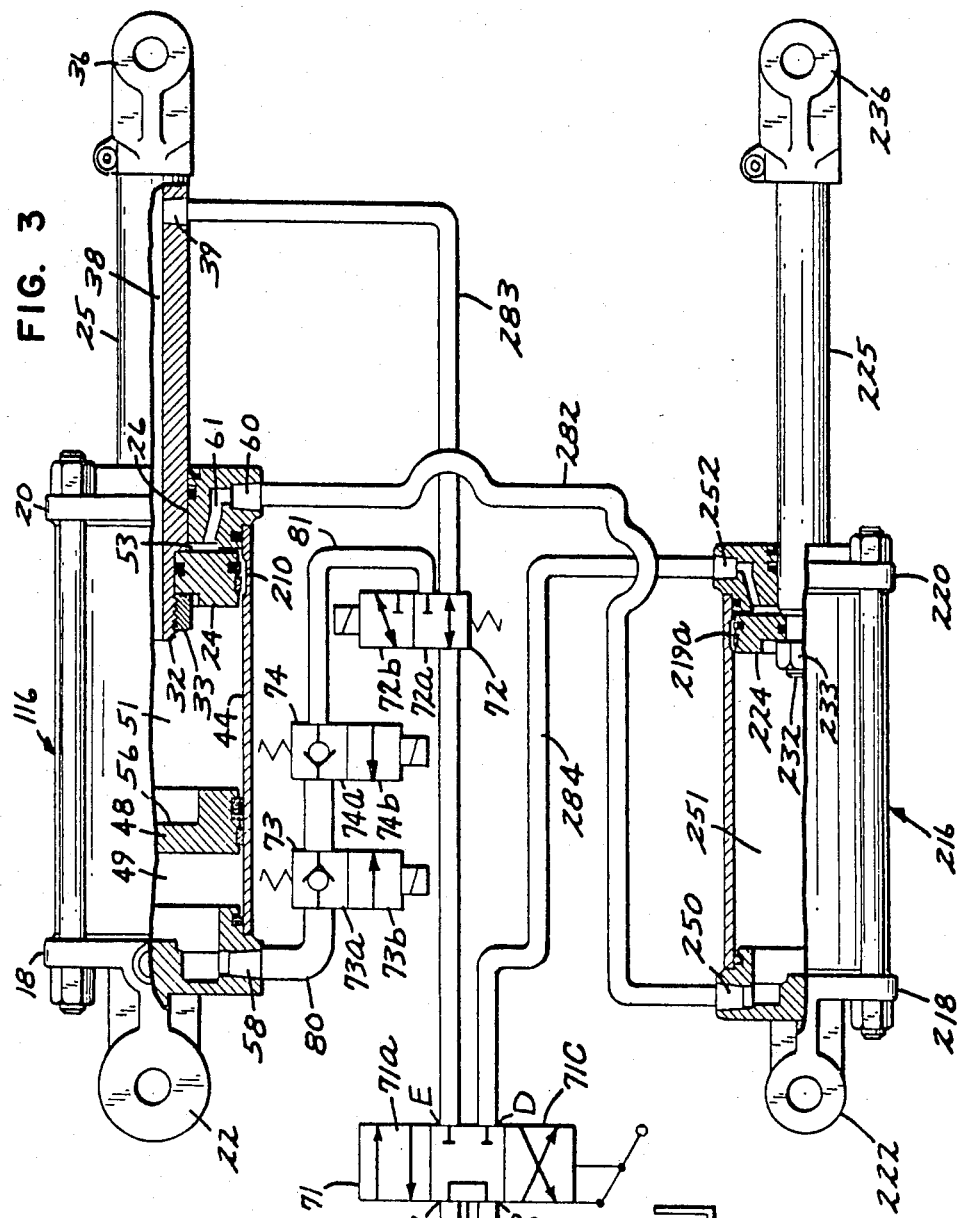
FIG. 3 is a schematic drawing of a second embodiment of the present invention involving master and slave cylinders.

Referring to FIGS. 1 and 2 of the drawings, there can be seen a preferred embodiment of the present invention. FIG. 2 of the drawings shows the preferred embodiment with portions broken away. The overall hookup of that embodiment is shown in FIG. 6 in schematic form.

FIG. 2 shows the remotely controlled adjustable stroke fluid cylinder 16 having opposite end walls 18 and 20. End wall 18 has a clevis-type projection 22 for attachment of the cylinder to an apparatus or implement to be moved. The system is shown in use on a plow in FIG. 7. A main piston 24 is attached to stem 25 which slidably extends through opening 26 in end wall 20. A seal 27 prevents leakage of fluid along stem 25 past wall 20. Stem 25 has a threaded end 32 which, by means of nut 33, affixes the stem to main piston 24. The exterior end of stem 25 has a clevis-like attaching element 36 similar to that of element 22. An elongated passage 38 is formed in stem 25 and extends between threaded end 32 and a point proximate clevis element 36 where the passage follows a right-angle bend and appears as an aperture 39 on the outer surface of the stem.

Piston 24 engages inner surface 44 of cylinder 16 and has a seal 46 for preventing passage of fluid thereby. Floating stop piston 48 is provided in the space between piston 24 and end 18 and also slidably engages inner surface 44 and has seals 50 and 50a. The surfaces of pistons 24 and 48 have annular recesses 52 and 56.

The region between cylinder 48 and end wall 18 is indicated by numeral 49, the second region between piston 48 and 24 is indicated by numeral 51, and the remaining region between end wall 20 and piston 24 is indicated by numeral 53.

An aperture 58 in cylinder 16 communicates with region 49 while aperture 60 through passageway 61 communicates with region 53. Aperture 39 in passage 38 permits communication with region 51. Ports 39, 58, and 60 are connected to control means indicated generally by the numeral 70 (shown in FIG. 6).

In the embodiment shown in FIG. 1, integral indicator means are provided. Extending generally perpendicularly from clevis element 36 is threaded member 62. Extending generally perpendicularly from member 62 is shaft 64, which is affixed to member 62 by nuts 63. Shaft 64 extends through a tubular guide element 66 and has a pointer 68 attached to shaft 64 proximate its distant end. Scale plate 69 is affixed to cylinder 16 in such a manner that pointer 68 will indicate the relative position of stem 25 and likewise piston 24 by the location of pointer 68.

Turning to FIG. 6, the valve system 70 is shown in schematic form as comprising valves 71, 72, and one-way check valves 73 and 74. Valve 71 may be the tractor selective control valve typically found as an integral part of modern tractors. The valves are hooked up as follows: conduit 80 connects aperture 58 to a series combination of check valves 73 and 74. Conduit 81 connects check valve 74 to valve 72 at connection A. Aperture 60 is connected to valve 71 at point D by conduit 82. Aperture 39 is connected to point B on valve 72 by conduit 83. Point C on valve 72 is connected to point E on valve 71 by conduit 84. Conduit 85 connects point P on valve 71 to pump 90, and point R is connected to reservoir 92 by conduit 86. All conduits except 83 are preferably made of steel or copper to prevent leakage. Conduit 83 must be made of flexible material to accommodate movement of stem 25.

Valve 71 is shown in schematic form having three positions indicated by boxes 71a, 71b, and 71c selectable by means 94. Box 71a indicates the fluid connection between points "P and D" and "R and E". Box 71b indicates the connection of points P and R, which merely connects the pump to the reservoir when the system is on standby. Box 71c shows the fluid connection of point "P and E" and "R and D".

Valve 72 has two positions shown by boxes 72a, 72b. Box 72a indicates the connection of points B and C while point A is blocked. Box 72b indicates the connection of points A and C while point B is blocked.

Check valve 73 is a one-way check valve having two positions 73a and 73b, 73a being the check position preventing flow from aperture 58 point A and 73b being the disable or bypass condition which allows such flow. Similarly, check valve 74, having two positions 74a and 74b, provides the same function as check valve 73 except in the opposite direction. The check valves 73 and 74 provide a positive lock against leakage therethrough so that the floating piston will not drift in position. In the preferred embodiment valves 73 and 74 are always operated simultaneously; however, it is only necessary to operate one at a time depending on the direction of flow desired.

OPERATION

The operation of this embodiment is explained as follows. In standby operation, pump 90 may be shut off or in the case of a continuous pumping system, position 71b of valve 71 can be selected so that the pump will discharge into the reservoir.

To move piston 24 and stem 25 out of cylinder 16, position 71c on valve 71 is selected simultaneously with position 72a on valve 72, while the check valves are in position 73a and 74a, thus blocking flow through conduit 80, 81. This circuit is indicated at Branch P5 of circuit 360 in FIG. 8. With the valves in the above-indicated positions, fluid will flow into aperture 39, filling region 51 with fluid, thereby causing region 53 to decrease in space and driving fluid through aperture 60 into reservoir 92. Floating piston 48 will not move because conduit 81 is terminated by a blocking seal at point A, and to further ensure against any leakage, check valves 73 and 74 prevent fluid flow in either direction.

Figure 8:
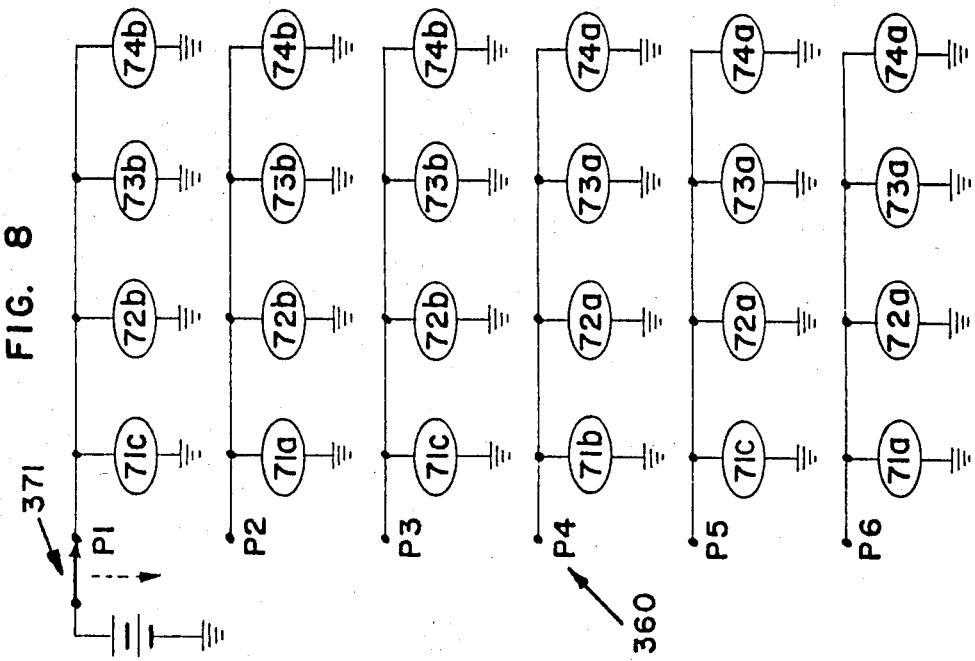
FIG. 8 is a schematic circuit of a preferred electrical connection of valves in FIG. 6.

Likewise, main piston 24 can be moved toward end 18 by the arrangement shown in Branch P6, FIG. 8, i.e., activation of 71a, 72a, 73, 74a.

To move piston 24 and stem 25 inwardly (i.e., toward end 18), positions 71a, 72b, 73b, and 74b are selected on the appropriate valves. (See Branch P2 in FIG. 8.) This allows fluid to be transmitted from pump 90 into aperture 60, which causes region 53 to expand, thereby driving fluid through conduit 38 and out aperture 39 and into reservoir 92. Likewise, both pistons can be moved toward end 20 (i.e., right) by the selection of valves 71c, 72b, 73a, and 74b as shown in Branch P1, FIG. 8.

To move floating stop piston 48 it is desirable to reduce the size of region 51 to a minimum (i.e., to bring pistons 48 and 24 into abutment) so that it is possible to know the exact stroke of piston 24. This is particularly relevant when the indicator means are provided for indicating the exact position of the piston. Pistons 24 and 48 can be brought into abutment by moving piston 24 as explained above. Piston 48 may then be moved toward end 20 by selecting positions 71c, 72b, 73b, and 74b on the corresponding valves. This will permit a flow of fluid from pump 90 into aperture 58, causing region 49 to expand, which in turn will cause region 53 to decrease in size, driving fluid through aperture 60, which will be passed through valve 71 to the reservoir 92. (See Branch P3 in FIG. 8.) Once this step has been completed, it may be desirable to return valve 74 to position 74a to totally prevent leakage in either direction.

To cause piston 48 to move toward end 18, positions 71a, 72b, 73b, and 74b are selected. (See Branch P2 in FIG. 8.) This will cause the flow of fluid from pump 90 into aperture 60, which will cause region 53 to expand, thereby decreasing the volume of region 49, which in turn drives fluid out of aperture 58 past the disabled check valve and into reservoir 92.

Branch P4 with 71b selected is a standby position.

It should be noted that valves 71, 72, 73, and 74 may be mechanically or electromagnetically coupled so that a single selection on valve system 70 will cause all appropriate valves to be operated to perform a particular function. FIG. 8 illustrates a preferred circuit showing this interconnection. Valves 72, 73, and 74 are shown in their normal position under spring bias and include solenoids to move them to their activated position. Valve means 70 includes an electric switch 371 for controlling the solenoids and switch 71.

ALERNATE EMBODIMENT

Figure 4:
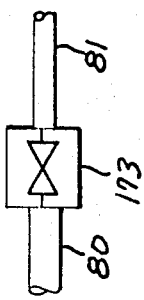
FIG. 4 is a schematic illustration of a manual control valve to replace check valves shown in FIG. 3.

Alternate embodiments of the present invention are shown in FIGS. 3, 4, and 5.

FIG. 5 illustrates an alternate embodiment of the indicating means. In this figure, the position of stem 25 and piston 24 may be read by remote indicating means 160. To the extent this embodiment is described in the previous discussion, those elements will not be repeated. Replacing shaft 64 in the previous embodiment is stem 164, which extends into portion 166a of a tubular member 166. Portion 166a is sized to receive stem 164. Tubular member 166a is affixed to cylinder 116 at ends 18 and 20. Shaft 164 includes a portion 164a which is preferably made of flexible material, as is at least portion 166b of tubular member 166 so that the shaft can transmit information to the indicating means 160 around curves, etc. Preferably, tubular member 166b is formed of wire wound in a helical formation having an aperture sized to receive portion 164a. The end of tubular member 166b is affixed at point 168 to graduated scale 169 and at point 170 to a rigid portion 166c carried by scale 169. A pointer 68 is attached to shaft 164a proximate its distant end allowing relative readings to be made on graduated scale 169.

As an alternative to check valves 73 and 74, it is possible to substitute a simple manually operated positive fueling valve 173 to replace check valves 73 and 74 as shown in FIG. 4.

A further alternative embodiment is shown in FIG. 3. This embodiment employs both master and slave cylinders. Again, to the extent this embodiment is similar to the previous embodiments, like numerals will be used and discussion of them should be had by reviewing the disclosure above. While the embodiment in FIG. 3 is shown without indicator means, it is understood that this aspect of the invention may be added as desired as shown in FIGS. 1 and 5.

With respect to main cylinder 116, it can be said that this element is substantially identical to that in the previous embodiment indicated by numeral 16 with the exception of an additional bypass located preferably on the interior surface of the cylinder wall. This bypass is formed as a depression or groove 210 which preferably covers only a portion of the circumference of the inner cylinder wall. This depression is located proximate end 20 and permits passage of fluid from region 51 to aperture 60 around main piston 24. The purpose of this bypass is to permit rephasing or resynchronization of both the master and slave cylinders The fluid paths created by conduits are substantially the same in FIG. 3 as in FIG. 6, with the exception that slave cylinder 216 is essentially connected in series with conduit 82. In FIG. 3, this is shown by numerals 282 and 284. Conduit 282 is connected to cylinder 216 at aperture 250 and, likewise, conduit 284 is connected to aperture 252 at one end and point D in valve 71 at the other end. Conduit 283 connects aperture 39 with point E on valve 71 through valve 72.

Slave cylinder 216 is structurally similar to cylinder 116 except floating piston 48 is not present. The volume of cylinder 216 is adjusted so that the travel of main piston 24 and 224 in the slave will be synchronized. No stop piston is necessary in the slave since its travel is entirely controlled by the master cylinder 116. As in cylinder 116, a depression 219a is formed in the inner surface of the cylinder wall to allow a bypass of fluid when piston 224 is in abutment with end 226 thereof and the stem 225 is fully extended.

OPERATION

Figure 9:
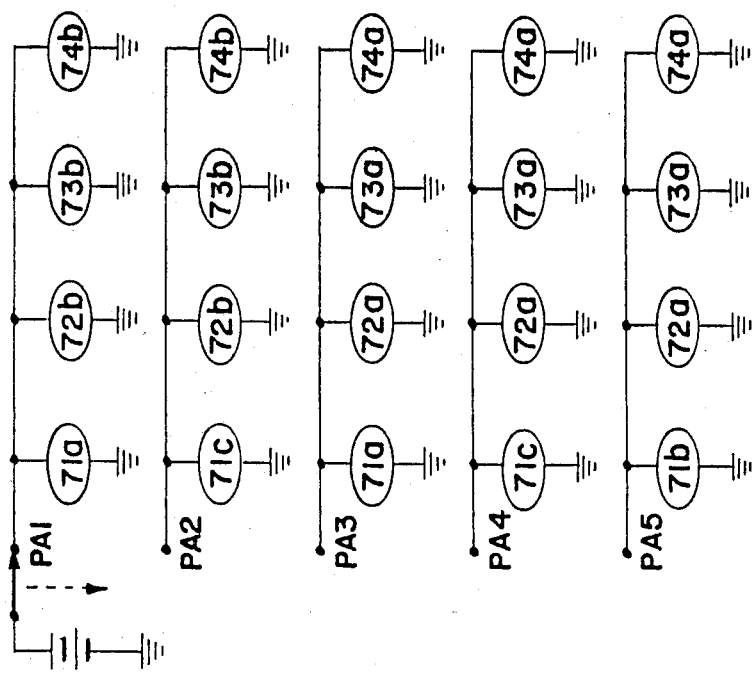
FIG. 9 is a schematic circuit of a preferred electrical connection of valves in FIG. 3.

The operation of the embodiment shown in FIG. 3 is similar to that of the embodiment in FIG. 6; however, the adjustment of the position of floating stop piston 48 is somewhat different due to the necessity of synchronizing or phasing both slave and master cylinders. FIG. 9 of the drawing is similar to FIG. 8 in showing the electrical connector of the circuit except that it pertains to this embodiment. Again, the valve are shown as biased in their "normal" position by springs and are moved to their activated position by solenoids.

To begin operation of this system, it is preferable to shift both main pistons 24 and 224 up against end members 20 and 220 respectively. This is accomplished by selecting the following positions on the valve: 71a, 72b, 73a, and 74b (Branch PA1 in FIG. 9). This arrangement will allow fluid to enter region 49 and cause region 51 to collapse as floating piston 48 comes into contact with piston 24. Fluid will escape around bypass 210 and out of aperture 60 where in turn it will fill region 251 in slave cylinder 216. When slave cylinder 216 is fully extended, bypass 219a will allow fluid to pass through to the reservoir 92.

The floating piston 48 may now be positioned by moving main piston 42 toward end 18 to the extent desired. This is accomplished by setting valves as follows: 71c, 72b, 73b, 74b (Branch PA2 in FIG. 9). Fluid will flow into aperture 252, causing slave piston 224 to compress region 251. There will be some loss of fluid around bypass 219a; however, this will be only momentary. The same compression will occur in main cylinder 116 and the fluid will exit aperture 58 on its way to reservoir 92. At the point at which the stroke length is to be set, one-way check valves 73 and 74 will be set to positions 73a and 74a, thereby locking the position of the floating stop piston 48. The location of the stop piston 48 will be apparent as the indicator scale 69, 169 which may be associated therewith. With floating stop piston 48 now set, it is possible to move the main piston in either direction as follows. Moving the piston towards end 20 involves setting the valves to positions 71a, 72a (while check valves 73 and 74 are closed; see PA3). Main pistons 24 and 224 will travel toward end 18 when valves 71c and 72a are selected (see Branch PA4). Standby, i.e., no movement, is shown as branch PA5 in FIG. 9.

Figure 7:
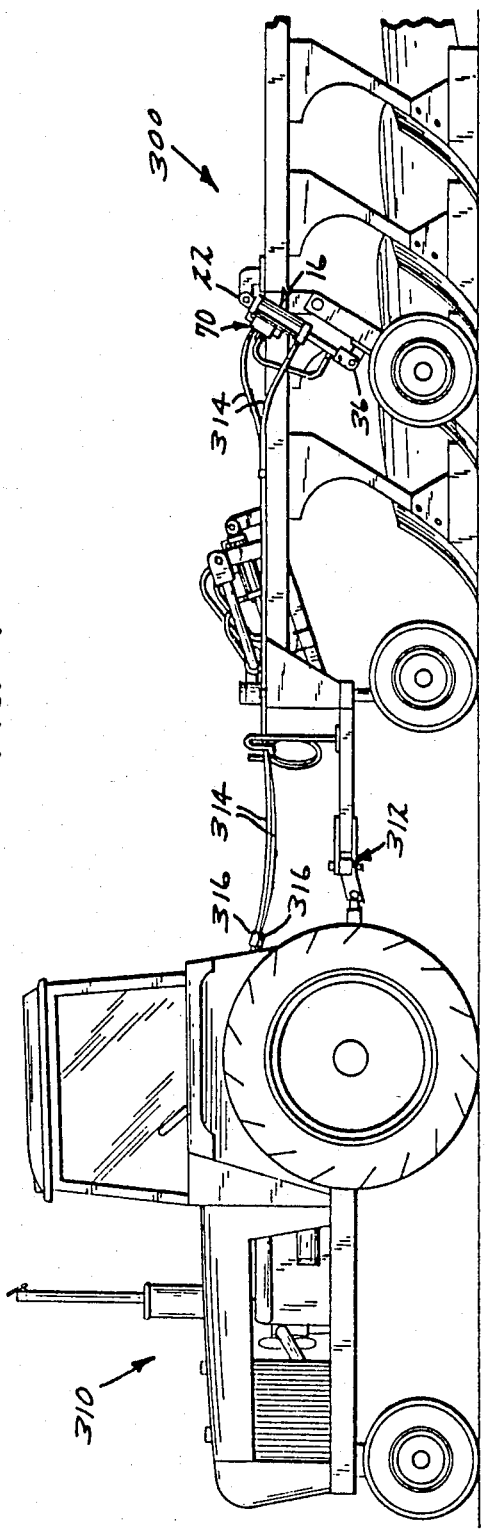
FIG. 7 is a side view of an embodiment of the present invention in use on a farm implement.

FIG. 7 illustrates a typical arrangement of the embodiment of the invention as employed on a farm implement. The farm implement 300 is attached to the tractor 310 by linkage 312. The source of hydraulic fluid, in this case, is on the tractor and is connected to the hydraulic cylinder 16 through conduits 314. Conduits 314 have disconnectable couplings 316. Typically disengagement of these couplings may be difficult and even dangerous if hydraulic fluid is under pressure therein. By means of valves 71 on the tractor and valves 73 and 74 on the implement, the couplings can be isolated from the pressure sources (i.e., the pump and the cylinder), making disconnection safe and easy while maintaining the fixed position of the pistons.

It will now be seen that the invention provides an adjustable stroke power cylinder system where the stroke may be infinitely adjusted by remote control means and the stroke length may be repeatedly achieved through a positive sealing check valve. In addition, visual indicator means are provided to permit the operator to know with reliability the position of the pistons. It is understood that the system is equally applicable to pneumatic as well as hydraulic operation.

While there have been described above the principles of this invention in connection with specific apparatus, it is to be clearly understood that this description is made only by way of example, and not as a limitation to the scope of the invention.

What is claimed is:

1. A hydraulic system comprising:
   (a) a main cylinder having first and second ends, a main piston, a floating piston, a first region defined by the space between said floating piston and said first end, a second region defined by the space between said floating piston and said main piston, a third region defined by the space between said main piston and said second end;
   said main piston including a stem extending outside said cylinder for transmission of fluid into and out of said second region;
   said first and second ends including apertures for transmission of fluid into and out of said first and third regions, respectively;
   (b) circuit means including a pair of selectively disableable one-way check valves oppositely oriented with respect to the direction of fluid flow checked so that when both of said check valves are in the check position the flow of fluid into and out of said first aperture is positively prevented;
   valve means for controlling the flow of fluid to said second aperture, said stem and said check valves;
   (c) means for controlling said valve means and check valves to provide:
   (1) a first position thereof which disables said check valves and permits the flow of fluid into said first aperture, out of said second aperture, whereby said main and floating pistons are caused to move toward said second end,
   (2) a second position thereof which disables said check valves and permits the flow of fluid out of said first aperture, into said second aperture, whereby said main and floating pistons are caused to move toward said first end,
   (3) a third position thereof which allows the flow of fluid into said stem, out of said second aperture whereby said main piston is caused to move away from said floating piston, and
   (4) a fourth position thereof which allows the flow of fluid into said second aperture, out of said stem aperture, whereby said main piston is caused to move toward said floating piston.

* * * * *